US007828424B2

(12) United States Patent
Jones et al.

(10) Patent No.: US 7,828,424 B2
(45) **Date of Patent: *Nov. 9, 2010**

(54) HEATER AND DRIP PLATE FOR INK LOADER MELT ASSEMBLY

(75) Inventors: Brent Rodney Jones, Sherwood, OR (US); Wangxi Fu, Tualatin, OR (US)

(73) Assignee: Xerox Corporation, Norwalk, CT (US)

(*) Notice: Subject to any disclaimer, the term of this patent is extended or adjusted under 35 U.S.C. 154(b) by 318 days.

This patent is subject to a terminal disclaimer.

(21) Appl. No.: 11/780,116

(22) Filed: Jul. 19, 2007

(65) Prior Publication Data

US 2007/0268348 A1 Nov. 22, 2007

Related U.S. Application Data

(62) Division of application No. 11/437,591, filed on May 19, 2006, now Pat. No. 7,246,895, and a division of application No. 11/437,586, filed on May 19, 2006, now Pat. No. 7,434,925.

(51) Int. Cl.
*B41J 2/175* (2006.01)
*G01D 11/00* (2006.01)

(52) U.S. Cl. .......................................... 347/88; 347/99

(58) Field of Classification Search .................. 347/88, 347/99, 84, 85, 95
See application file for complete search history.

(56) References Cited

U.S. PATENT DOCUMENTS 4,437,100 A * 3/1984 Sugitani et al. ............... 347/65
5,406,315 A 4/1995 Allen et al.
5,424,767 A 6/1995 Alavizadeh et al.
5,467,112 A * 11/1995 Mitani ........................... 347/1
5,467,118 A 11/1995 Gragg et al.
5,518,758 A * 5/1996 Tiburtius et al. ............... 427/8
5,539,437 A * 7/1996 Penwell ....................... 347/54
5,614,007 A * 3/1997 Kurabayashi et al. .... 106/31.27
5,734,402 A 3/1998 Rousseau et al.
5,742,314 A * 4/1998 Hayes ......................... 347/93
5,784,089 A 7/1998 Crawford
5,832,835 A 11/1998 Scheuhing
5,861,903 A 1/1999 Crawford et al.
5,932,643 A * 8/1999 Kenny ........................ 524/276
6,056,394 A 5/2000 Rousseau et al.
6,089,686 A 7/2000 Thornton et al.
6,193,365 B1 2/2001 Ikezaki
6,283,588 B1 * 9/2001 Brandon et al. ............... 347/86
6,398,355 B1 * 6/2002 Shirota et al. ............... 347/100

(Continued)

FOREIGN PATENT DOCUMENTS

EP 0 683 051 A2 11/1995

(Continued)

*Primary Examiner*—Stephen D Meier
*Assistant Examiner*—Leonard S Liang
(74) *Attorney, Agent, or Firm*—Maginot, Moore & Beck LLP

(57) ABSTRACT

A melt assembly that includes a drip plate; and a self regulating heating device thermally connected to the drip plate, wherein the heating device is a positive temperature coefficient material (PTC material). Also, a drip plate having an open interior into which a heating device may be inserted or molded.

8 Claims, 7 Drawing Sheets

U.S. PATENT DOCUMENTS

| | | | | |
|---|---|---|---|---|
| 6,530,655 | B2 * | 3/2003 | Jones et al. | 347/88 |
| 6,572,225 | B1 | 6/2003 | Jones | |
| 6,607,259 | B2 * | 8/2003 | Mott et al. | 347/18 |
| 6,698,876 | B2 * | 3/2004 | Sato et al. | 347/100 |
| 6,905,201 | B2 | 6/2005 | Leighton | |
| 7,118,205 | B2 | 10/2006 | Jones et al. | |
| 7,156,510 | B2 * | 1/2007 | Hilton et al. | 347/86 |
| 7,210,773 | B2 * | 5/2007 | Jones | 347/88 |
| 7,210,774 | B2 * | 5/2007 | Jones | 347/88 |
| 7,246,895 | B2 | 7/2007 | Jones et al. | |
| 7,434,925 | B2 * | 10/2008 | Jones et al. | 347/88 |
| 2002/0180852 | A1 | 12/2002 | Jones et al. | |
| 2005/0084605 | A1 * | 4/2005 | Kathirgamanathan | 427/64 |

FOREIGN PATENT DOCUMENTS

| | | |
|---|---|---|
| JP | 2003-200589 | 7/2003 |

* cited by examiner

FIG. 5
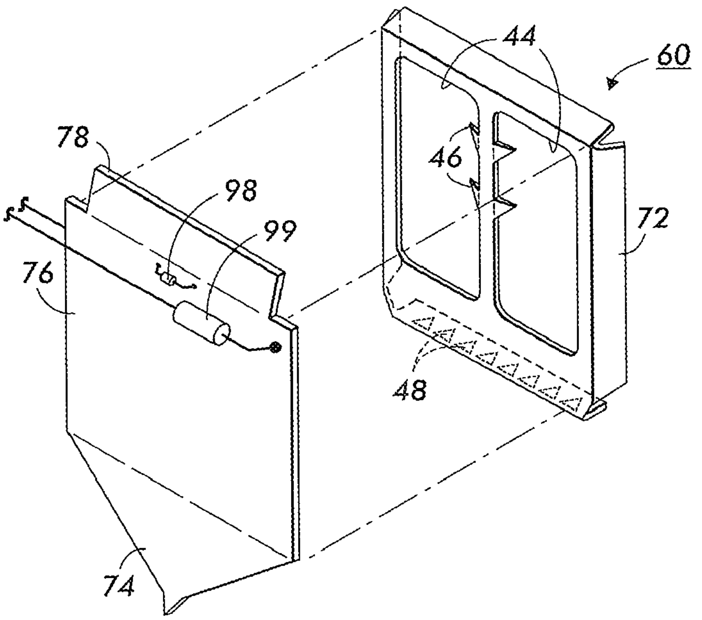
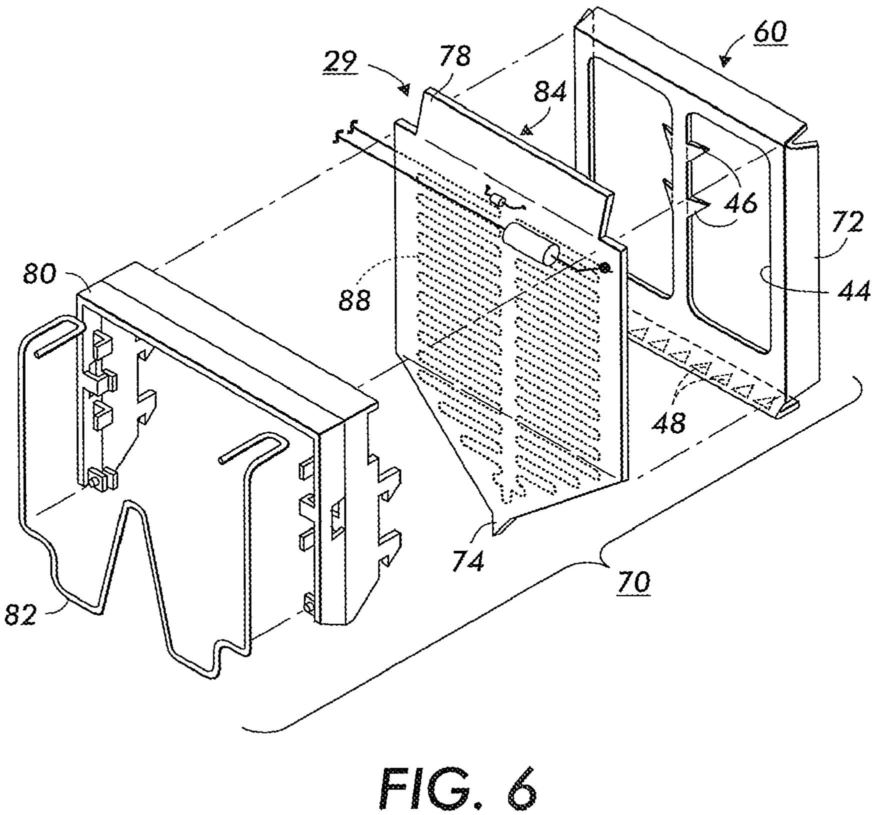
FIG. 6

HEATER AND DRIP PLATE FOR INK LOADER MELT ASSEMBLY

This application is a divisional of U.S. Divisional patent application Ser. No. 11/437,591, filed May 19, 2006, which claims priority from U.S. patent application Ser. No. 10/736,654, filed Dec. 16, 2003, and is related to U.S. application Ser. Nos. 10/737,355 and 10/737,656, filed Dec. 16, 2003, and U.S. Divisional patent application Ser. No. 11/437,586, filed on May 19, 2006, the entire disclosures of which are incorporated herein by reference.

The present invention relates to ink loaders for phase change ink printers, and more specifically to solid ink melters for such printers.

Ink can be deposited into the print head of a phase change printer in either a solid or a liquid state. The earliest printers produced by Tektronix required that solid ink sticks be inserted into a reservoir structure that was part of the print head. The ink was then melted in this structure. This did not allow the user to stage extra volumes of ink for use when needed by the printer.

Later, Brother, Tektronix, and Xerox phase change printers used an intermediate ink-loading device to store extra ink. The Brother printer deposited small pieces of solid ink into the reservoir where it was melted, solving the problem of a very limited supply of ink on board the printer. This implementation, however, still imposed the need for the print head unit to supply enough heat to melt the ink and consequently compromised temperature uniformity. Tektronix and Xerox products melted the ink first, depositing liquid ink into the reservoir, speeding the melt process and addressing the thermal uniformity issue. To melt the ink before it reaches the print head, these products used a fairly expensive ceramic hybrid heater using a positive temperature coefficient device in series with the heater to limit upper temperatures. This hybrid heater solution works well, but is costly. Also, the melt plate heater assembly cannot be bent and ends up being essentially flat, thereby limiting the ink loader position to directly above the receiving openings of the print head reservoir because the main drip plate is made of ceramic material. Ceramic material also has a relatively poor thermal conductivity in comparison to aluminum and other similar non ferrous metals, which reduces the melt speed and uniformity of the thermal energy spread over the typical short periods of heater on time during a melting operation.

Other areas exist where current melt plate assemblies may be improved. Existing melt plate assemblies lack upper flow control. Features to catch ink slivers are present under only a portion of an ink stick. Flanges or physical features to curb flow of the ink melt front at the top of the plate are not present, though ink may overflow this area. Ink overflowing at the top can lead to unintended drip locations. The current melt plate assemblies also suffer from a poor thermal connection between the melt plate, which the ink makes direct contact with and the heated drip plate, which directs the molten ink flow to the point of a tapered portion of the drip plate where it establishes a fairly precise gravity fed flow or drip path to the print head reservoir below. The single, large high temperature plastic adapter used to mount the melt plate assemblies onto the ink loader feed chute is very costly and requires complicated wire routings to make power connections to each of the 4 heaters, which all have different length wires. This adapter configuration results in the ink loader positioned relative to the print head such that tilt range is limited and inadequate clearance exists for desired print head insulation layers.

What is needed is a melt plate design that can take advantage of the thermal properties of aluminum, brass, copper or similar materials. The melt plate and heater should be formed so that a drip point can be established at a point other than on or near the melt plate or ink interface planes, allowing additional clearance between print head and ink loader. Heater technologies that allow a significant cost reduction to costs are also desirable. Features designed to catch ink slivers or prevent them from sliding off the drip plate without being melted should be configured so that they are small enough in size that they can be present over the full width of the stick.

Embodiments include a melt assembly that includes a drip plate; and a self regulating heating device thermally connected to the drip plate, wherein the heating device is a positive temperature coefficient material (PTC material). Also, a drip plate having an open interior into which a heating device may be inserted or molded.

Various exemplary embodiments will be described in detail, with reference to the following figures, wherein:

FIG. 5 is a perspective view of an exemplary embodiment of a drip plate and an exemplary embodiment of a melt plate.

FIG. 6 is an exploded view of a melt plate assembly including an adapter.

Figure 1:
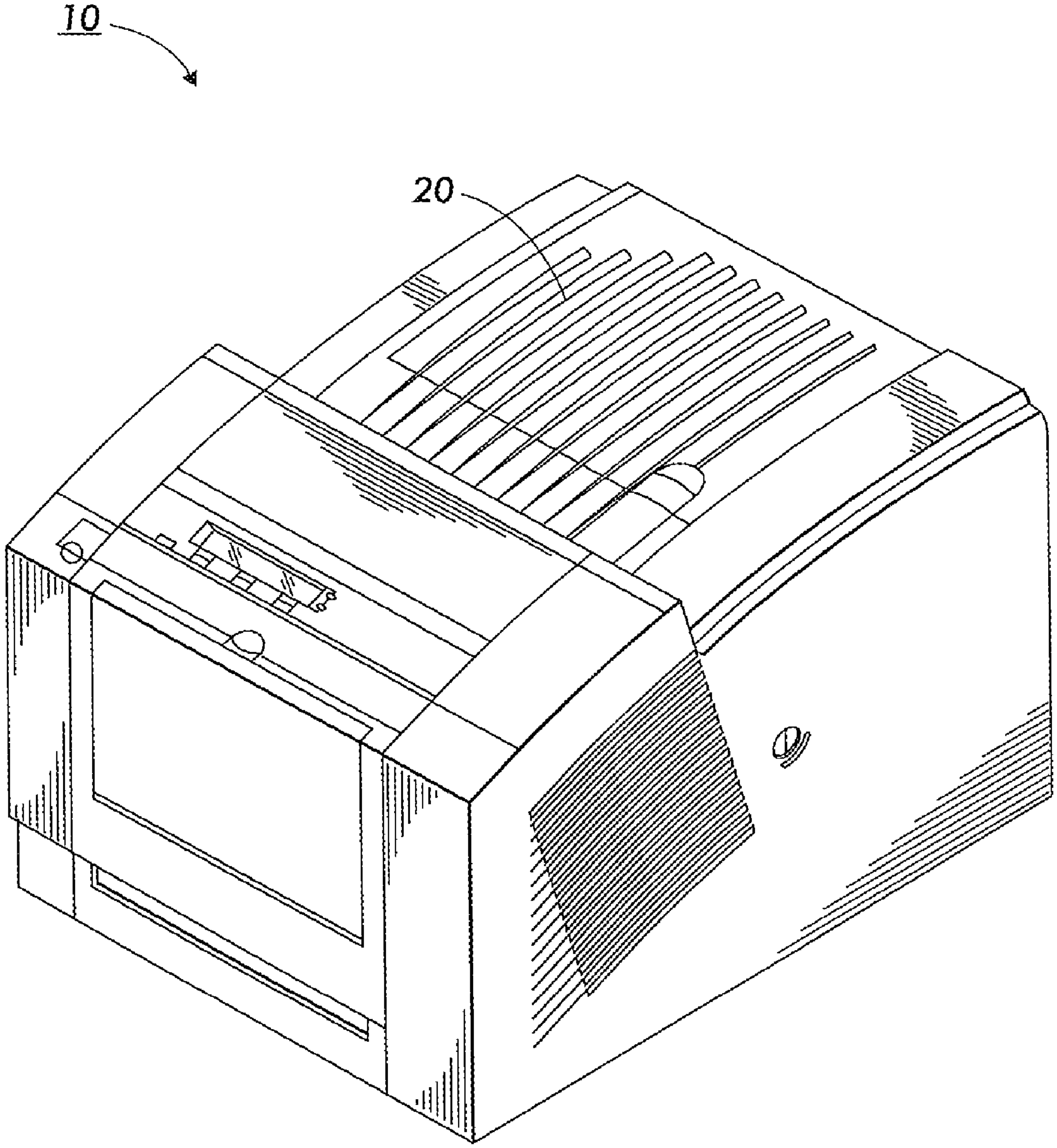
FIG. 1 is a perspective view of an exemplary embodiment of a color printer with the printer top cover closed.

FIG. 1 discloses an exemplary embodiment of a solid ink or phase change printer 10 having an ink access cover 20. FIG. 1 shows the ink access cover 20 in a closed position in FIG. 1.

Figure 2:
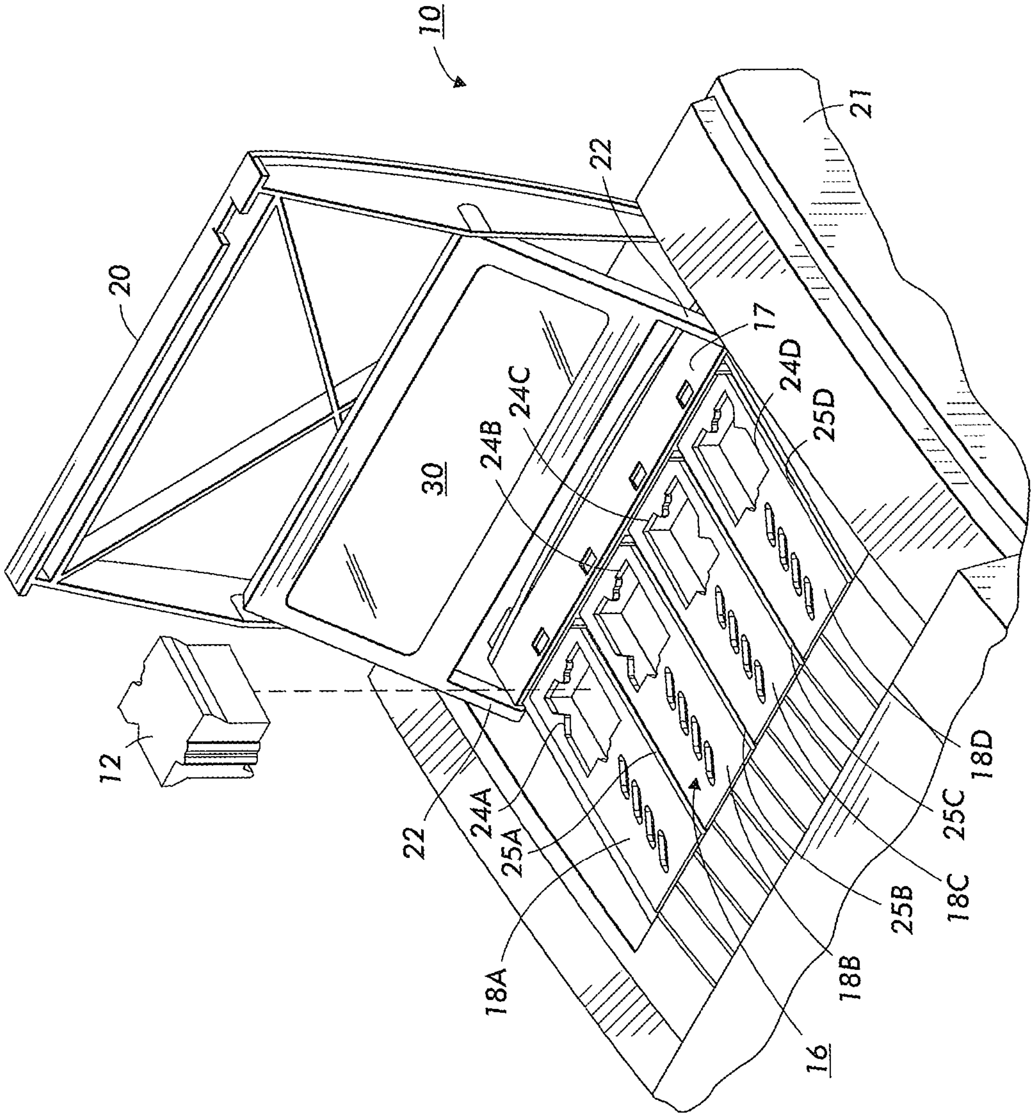
FIG. 2 is an enlarged partial top perspective view of the printer of FIG. 1 with the ink access cover open.
Figure 8:
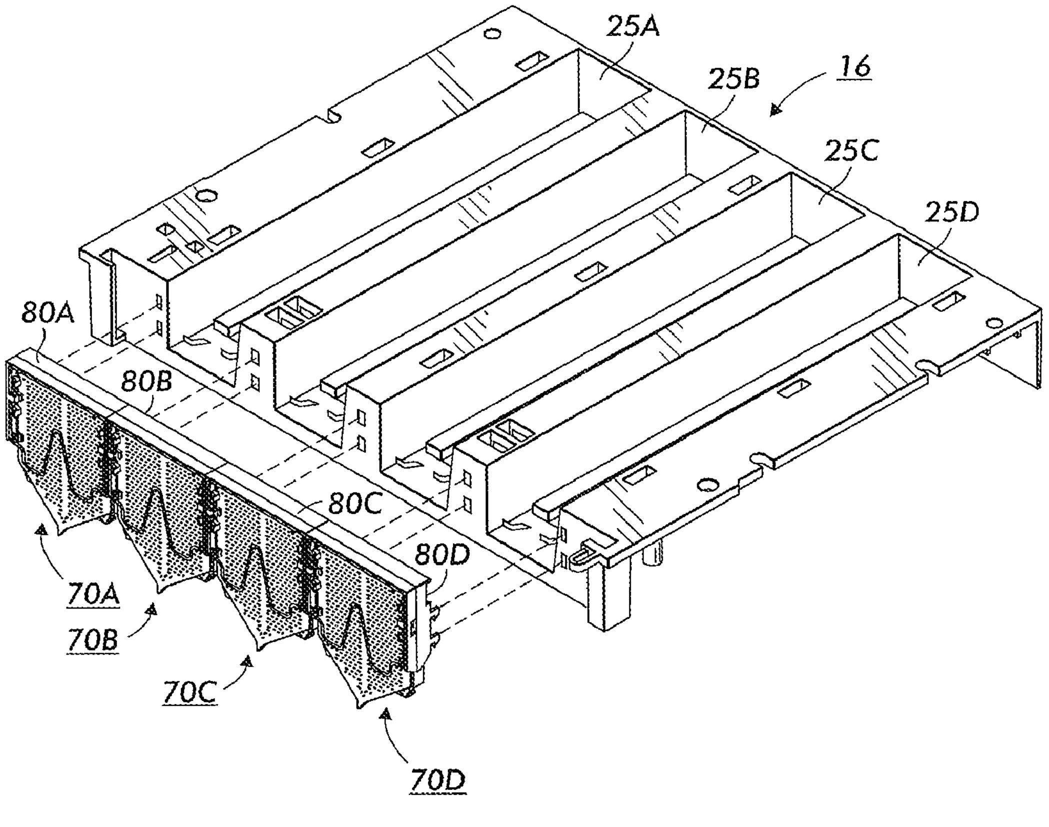
FIG. 8 is an exploded view of an ink loader.

FIG. 2 illustrates the printer 10 with its ink access cover 20 raised. The printer 10 includes an ink load linkage element 30, and an ink stick feed assembly or ink loader 16. A key plate or key plates 18 are positioned within the printer over a chute 9 divided into multiple feed channels 25. In the embodiment illustrated in claim 1, multiple key plates 18 are shown. The key plates 18 include insertion openings or receptacles 24. Each of the four ink colors has a dedicated channel for loading, feeding, and melting in the ink loader. The channels 25 guide the solid ink sticks toward the melt plate assemblies 70 located at the opposite end of the channels from the key plate insertion opening. These melt plate assemblies 70 are shown in FIGS. 3-8. FIG. 8 is an exploded view of the channels 25 and the heat plate assemblies 70. They melt the ink and feed it into the individual ink color reservoirs within a print head (not shown) inside the printer 10.

In the raised position, the attached ink load linkage element 30 pivots and causes the sliding yoke 17 to be positioned at the rear of the channels 25, disclosing the ink stick openings 24 in the key plates 18. The ink load linkage 30 is pivotally attached to the ink access cover 20 and a yoke 17. When the access cover 20 is raised, the pivot arms 22 pull on the pivot pins 23 of the yoke and cause it to slide back to a clear position beyond the ink insertion openings 24, thereby allowing ink to be inserted through the ink insertion openings into the ink loader. Yoke 17 is coupled to the chute 9 such that it is able to slide from the rear to the front of the chute (toward the melt plates) above the key plates 18 as the ink access cover is closed. Ink stick push blocks are linked to the yoke so that this movement of the yoke 17 assists in moving the individual ink sticks 12 forward in the feed channels 25 toward the melt plates 60. Hook features on the yoke 17 allow it to snap in place on the channel side flanges when positioned beyond the normal range of motion, where even in that forced position, it remains clipped to the channel flanges with partial overlap.

Preloading of each color row of ink sticks against the corresponding melt plate 60 A-D is facilitated by use of constant force springs (not shown) acting on push blocks which push the individual ink sticks 12 toward the drip plates 29A-D, as seen in FIG. 2. The springs are wound on rotatable drums (not shown) housed in the push blocks.

The anchored end of the springs are attached to the yoke 17 which is connected to the top cover 20 through the ink load linkage element 30 of FIG. 1. The ends of the yoke 17 are captivated to the key plates 18 by hook shaped ends so as to provide a linear slide along the opposing sides of the key plates 18.

The foregoing description of an exemplary ink stick loader should be sufficient for the purposes of the presently described heat plate assembly. For a further description of ink stick feed loaders, see, for example, U.S. Pat. Nos. 5,734,402, 5,861,903, 6,056,394 and 6,572,225.

Figure 3:
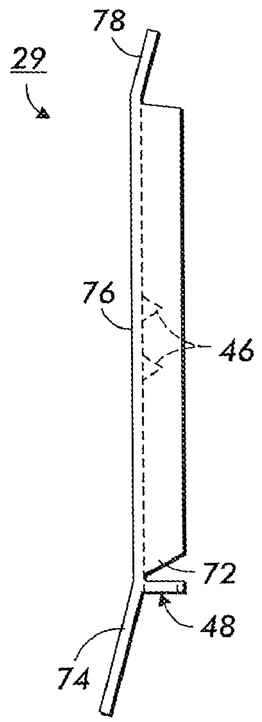
FIG. 3 is a schematic illustration of a drip plate.
Figure 4:
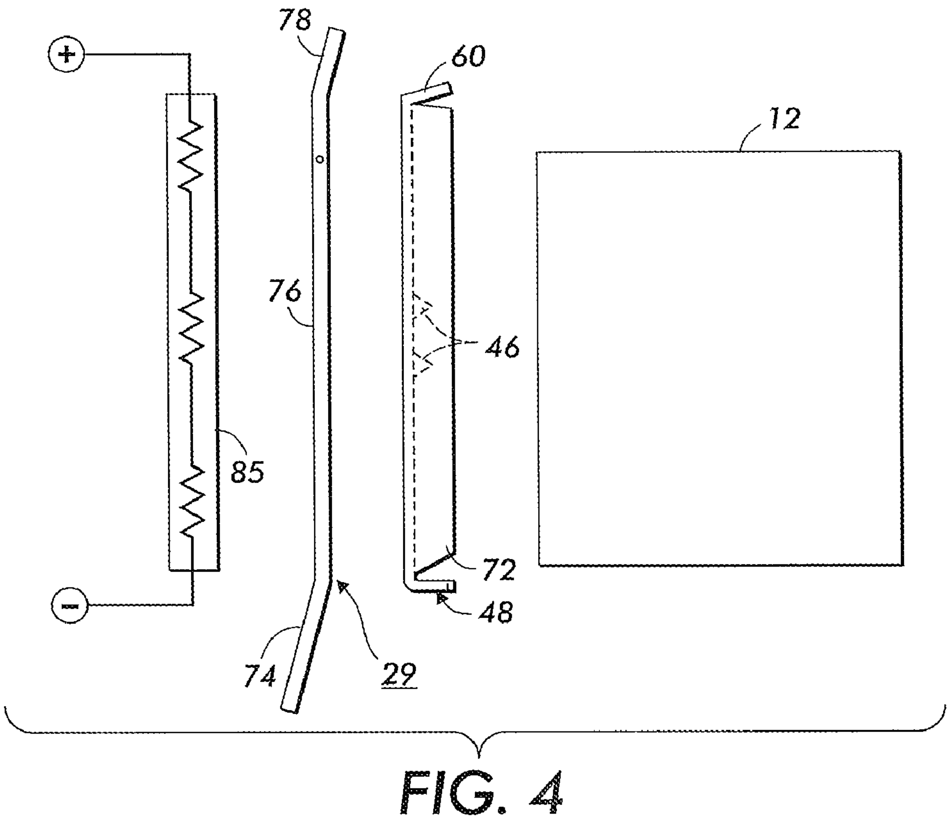
FIG. 4 is a schematic illustration of the melt assembly including a melt plate and a drip plate.
Figure 7:
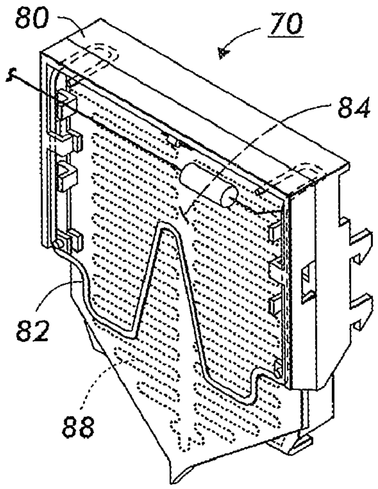
FIG. 7 is a perspective view of an exemplary embodiment of the melt plate assembly and adapter when assembled.

FIGS. 3-8 illustrate an exemplary embodiment of a melt plate assembly 70. Each assembly 70 includes a drip plate 29 a heating mechanism 85 and an adapter 80. In embodiments, and historically, the assembly has also included a separate melt plate as shown in FIGS. 4-6. In these embodiments, one surface of the melt plate is fastened to one surface of the drip plate. Methods of fastening include, for example, welding, riveting, and bonding.

In embodiments, the drip plate 29 (and melt plate 60, if one is used) is metallic. Specifically, the plate(s) could be made of a non-ferrous metal such as, for example, aluminum, brass, or copper. These materials are good because they allow greater flexibility in physical characteristics of the drip plate. In addition, these metals conduct heat better, which is important in embodiments where the heating mechanism is on the other side of the drip plate from the ink stick. Alternatively, the drip plate 29 could be made of plastic, the advantages of which are discussed in reference to FIG. 11.

The ink side of the melt assembly 70 has been configured so that it contains melting ink and reduces the possibility of molten ink coming into contact with the support structure at the edges of the drip plate 29, which can lead to a gradual build-up of stalactites/stalagmites of solidified ink. Such a build-up could eventually jam the ink sticks 12 and prevent contact of the ink stick with the heater, causing a failure of the ink load system to deliver ink to the reservoir when called upon to do so.

To help prevent this problem, embodiments of the ink side of melt assembly 70 includes a flange 72 at each side or have partially elongated protruding bent sides that limit the ability of ink sticks to slide sideways. In embodiments with separate drip plates 29 and melt plates 60, the flanges 72 would preferably be a part of the melt plate 60 as shown in FIGS. 4-5. These flanges 72 also prevent the flow of molten ink from coming into contact with the melt plate assembly support structure.

As shown in FIGS. 4-6, the melt plates 60 can include a plurality anchor tabs 46 or sliver control tabs 48 or a combination thereof. As a group, these surface features help maintain the tentative bond between ink and melt plate needed to prevent ink chunk and break-off chips from causing printer cleanliness and functional problems. Melt plates having tabs such as these are disclosed in more detail in U.S. Pat. No. 6,530,655.

It should be understood that the shapes represented in FIGS. 4 and 5 serve to clarify intended function and placement but could be produced in a variety of sizes, forms and location or pattern configurations. FIG. 5 shows an embodiment of a melt plate, which fastens to a drip plate, that includes two pairs of anchor tabs 46, two relatively large cut out portions 44, and an elongated row of sliver control tabs or sliver strainer 48 running a substantial portion of the width of the melt plate 60. However, other configurations are certainly possible.

As should be clear anchor tabs 46, and sliver strainer 48 could all be part of the drip plate 29 as well. FIG. 3 illustrates a drip plate having anchor tabs 46 and sliver strainer 48. In melt assembly embodiments having a drip plate 29 and a melt plate 60, the melt plate is supplied with large cutout portions 44 to increase heat transfer from the heater, through the drip plate, to the ink stick.

The anchor tabs 46 are included to hold ink sticks in place while the loader and or printer is moved. In embodiments, the anchor tabs 46 are located inside the area of the melt plate 60 that the ink stick 12 contacts. When the ink is solidified the ink stick is securely adhered to the melt plate 60 and is not likely to come loose when exposed to shock and vibration, thereby also not aggravating the tendency for melt front chips to break free. The anchor tabs 46 can also serve the concurrent purpose of adding significant heated surface area to which the ink is exposed when the loader is in use, thereby increasing the melt rate. In systems with simply a drip plate, the anchor tabs would preferably be located near the center of the drip plate 29.

In embodiments, the sliver strainer is a row of sliver control tabs 48 that are narrow, upturned catch tabs that have been added to the lower edge of the melt plate 60 to serve as catches for separated ink sections or slivers. Placed in the flow path of melting ink, the sliver control tabs 48 impede moving ink slivers from sliding off the melt plate 60 as large chunks. In embodiments, these tabs 48 have a width and spacing between approximately 1 mm and approximately 4 mm. The sliver control tabs 48 are spread over nearly the full width of the melt plate so that large or small slivers forming at or sliding to any region within the side flange boundary of the melt plate will be held so the ink can melt without sliding off the plate. The sliver control tabs 48 function like a strainer, hence the group will also be referred to as the silver strainer 48. The sliver strainer geometry can also be created by bending up a tab or flange that has an array of slots or holes. FIG. 3 shows a drip plate 29 having a sliver strainer 48 for single plate embodiments.

The combination of appropriately sized and shaped cutouts 44, protrusions 46, and control tabs 48 is the preferred way to produce anchoring as they can be added to a melt plate forming tool without resulting in appreciable cost increases. Roughing the surface would also provide a bonding benefit and might be employed, though the process would add to costs and could cause undesirable burrs or add particulate matter to the back side where they might degrade the thin electrical insulation film.

The drip plate 29 also includes a drip plate point or drip point that can be configured in any fashion that causes ink to drip or flow from a desired location. This could be literally a point, but more typically would be a narrow or tapered shape that may have a flat or rounded portion at the end.

In embodiments, the drip plate 29 has a lower portion 74 that is not coplanar with the upper portion 76 and includes the drip plate point. In embodiments, the drip plate 29 has a lower portion 74 that is not coplanar with the upper portion 76. See FIGS. 3 and 4. The bent tip 74 directs ink flow so that it "reaches" out over a reservoir, such as, for example, a print head reservoir (not shown). The bent tip 74 allows the ink loader to be positioned well back from the upper portion of a tilted print head. This is useful because the print head itself will often be wrapped in insulation, which can interfere with the ink loader when the head tilts between its maintenance, standby, and parked positions. Having a separation between the loader and the print head yields greater flexibility in printer design.

It is also possible for ink to flow over the top of the melt plate assembly. To help prevent this from occurring, either plate can be configured to have a bent upper flange that extends upward to block any potential flow of melted ink from behind the melt plate 60. In embodiments, the drip plate 29 and the melt plate 60 have an upper flange 78 that extends over the ink interface surface of the melt plate 60 as shown in FIGS. 3-5. In single plate embodiments, the flange extends over the ink interface surface of the drip plate.

In two plate embodiments, the melt plate assembly includes direct face to face contact between the drip plate 29 and the melt plate 60. As described elsewhere in this description, the melt plate has side flanges that limit the spread of the melt flow toward the sides and anchor features that grip or anchor the ink when the melt front is solidified. In embodiments, the upper region of the side flow flanges incorporate an interlocking feature that causes the melt plate and drip plate to be properly positioned and aligned with one another when they are coupled. The plates can be bonded, secured with tabs or other means, riveted, or, preferably, spot welded together, further improving the thermal energy conductivity between them.

The melt or drip plate, but preferably the drip plate, can further have notched or extending features at the sides for positioning and mounting interface to the ink feed chute or another component of the ink loader assembly.

Instead of a single expensive monolithic adapter, the present design includes four smaller identical units 80 that couple each of the heated melt plate assemblies 70 to its corresponding ink loader channel 25. Melt plate adapters 80 position and retain the drip plates 29A-D and melt plates 60A-D. The adapters 80 are offset a desired distance from the front of each channel 25. The melt plate adapters 80 mount to each channel 25 and function as a safety barrier against high temperature and voltage by enclosing the top, front and sides of the melt plate area. These individual adapters 80 are typically made of high temperature plastic. Each of the four (one for each channel) melt plate assemblies 70 are identical and use the same length wire, adding to the cost savings over the existing design. The adapters 80 also have features that allow the drip plate to easily clip into place and mounting tabs that clip into place on the front of the ink loader chute. For example, a retaining clip 82 is shown that holds the drip plate in position and also engages features in the chute to hold the melt assembly in place. The adapters also may incorporate features with a variety of different configurations to secure the heater thermistor and/or fuse, route and secure cabling and provide strain relief to the cables so the point of their attachment is not stressed. Additionally, the adapter can include features to attach a separate low mass clip that could be used to secure heaters or heater components.

Multiple methods of heating the melt plate 60 can be used. In prior phase change devices, the heating apparatus was located on the same side of the drip plate 29 as the ink sticks. However, traditional heating mechanisms still leave room for improvement. It is desirable to use alternative approaches to the expensive hybrid heaters on ceramic material used in current printers. In embodiments, the heating element can be located on the side 84 of the drip plate 29 opposite the ink sticks. See FIG. 4. In FIG. 4, heating element 85 contacts the surface of drip plate 29. The other surface of the drip plate contacts the melt plate 60, which in turn contacts the ink stick 12. In embodiments, the heating element 85 will be bonded to a first surface of the drip plate 29 and the ink sticks will contact a melt plate 60 bonded to a second surface of the drip plate 29. In embodiments without a heat plate, the ink sticks will contact the second surface of the drip plate directly.

One drip plate heater technology that could be used is a closed loop heater where a thermocouple or thermistor 98 is used to monitor temperature. This type of heater might also use a thermal fuse 99 to ensure a safe upper limit to the heater device. This type of heater adds to the cost of the printer due to the use of electrical components and wiring connections that sense and monitor the temperature, but as a whole this added cost is minimal and can be offset by the efficiency benefit and lower mass of applicable heaters. The most efficient and lowest mass heater technology is a foil heater encapsulated within a thin electrically insulative material 88, such as, for example, Kapton film. This light weight, flexible heater can be bonded onto the drip plate surface and will follow reasonable 3D surface topography, so is ideal for the new formed drip plate of the present concept. See FIGS. 4-6. Silicone heaters are likewise suitable, although these have a higher mass and are less efficient due to increased thermal resistance between the heater and plate.

Another heater technology that can be employed is a positive temperature coefficient (PTC) device 86 used singularly as the heating means. In previous melt plate assemblies, a PTC device was used to limit the temperature of a non PTC primary heating element. However, a PTC device with the correct properties can be used a heating device itself. A PTC heater 86 would work well in conjunction with the melt and drip plate assembly 70 described herein. Useful PTC heating devices typically have a fairly low electrical resistance at room temperature that sharply increases at some higher target temperature. When a PTC heater reaches the target temperature, the wattage is lowered so dramatically that the temperature of the plate to which the PTC is coupled is sustained or even drops. Such heating devices would be self-regulating. The primary benefit of using a PTC heater in a printer ink loader for pre-melting ink is its low cost and safe operation, since the upper temperature of such a device is self limiting.

The appropriate PTC material to be used will of course depend upon a number of factors, including, but not necessarily limited to, the environmental temperature, the ability of the melt plate assembly to transfer heat, the size and shape of the ink blocks, the melting temperature of the ink blocks, the amount of surface area contact between the melt plate assembly and the PTC material and between the melt plate assembly and the ink sticks, the thermal coefficient of the material and the mass of the material included, and the manner in which a current is passed through the PTC material.

In embodiments, the system environment within phase change ink printers is around 60° C. In some cases, such as where a printing device has recently been started, after a lengthy downtime, ambient temperature may only be between 20° and 60° C. In order to initiate melt as soon as possible after power up, the power dissipated by the PTC material at lower temperatures should be relatively high. In embodiments, the PTC material would dissipate on average about 75 Watts within a temperature range of about 30° to about 105° C. In embodiments, an output of about 50 Watts is used to maintain steady state melting of the ink sticks at a predetermined targeted drip rate which requires a PTC temperature of about 160° C. The PTC surface temperature will typically have to be more than that necessary to sustain the ink melt temperature. In normal operation, the melt plate will not attain the maximum PTC Surface Temperature because of the energy being consumed by the melt process and to a lesser extent, losses through radiation, conduction and convection. In embodiments, the PTC surface is about 50° warmer than the 110° needed to maintain steady melting of ink sticks. Ink temperature continues to rise before it drips off the drip plate. In embodiments, the target drip temperature is about 125° C. and not more than about 140° C. The PTC reduces power to about 10 Watts or less when the temperature is from about 190° to about 200° C. This upper end is important. There are situations where a melter may be active and no ink will be in contact with the heated melt plates. In these cases, it is important that the limit temperature be between 190 and 200° C. to prevent damage to structural components. Additionally, temperatures of over 200° C. can damage the ink. In embodiments, the PTC material is supplied with the equivalent of 87VAC-RMS. Peak voltage can range from 87 to 277 Volts.

The PTC heating device 86 could be soldered, bonded or held against the electrically conductive drip plate with external force, such as with a mounting clip or an external spring. The mass of a PTC heater is high relative to the mass of some other kinds of heaters and its mass, along with that of any mounting implements used, tends to reduce the efficiency of the heated system. Therefore, to reduce the total mass associated with using a PTC heater 86, the heater can be implemented using a "single sided" fabrication method. See FIGS. 8-9. In such a method, a PTC composition is placed over an alternating conductive grid such that current passes through the semiconductor material nearly in parallel with the surface having the PTC coating or element.

Figure 9:
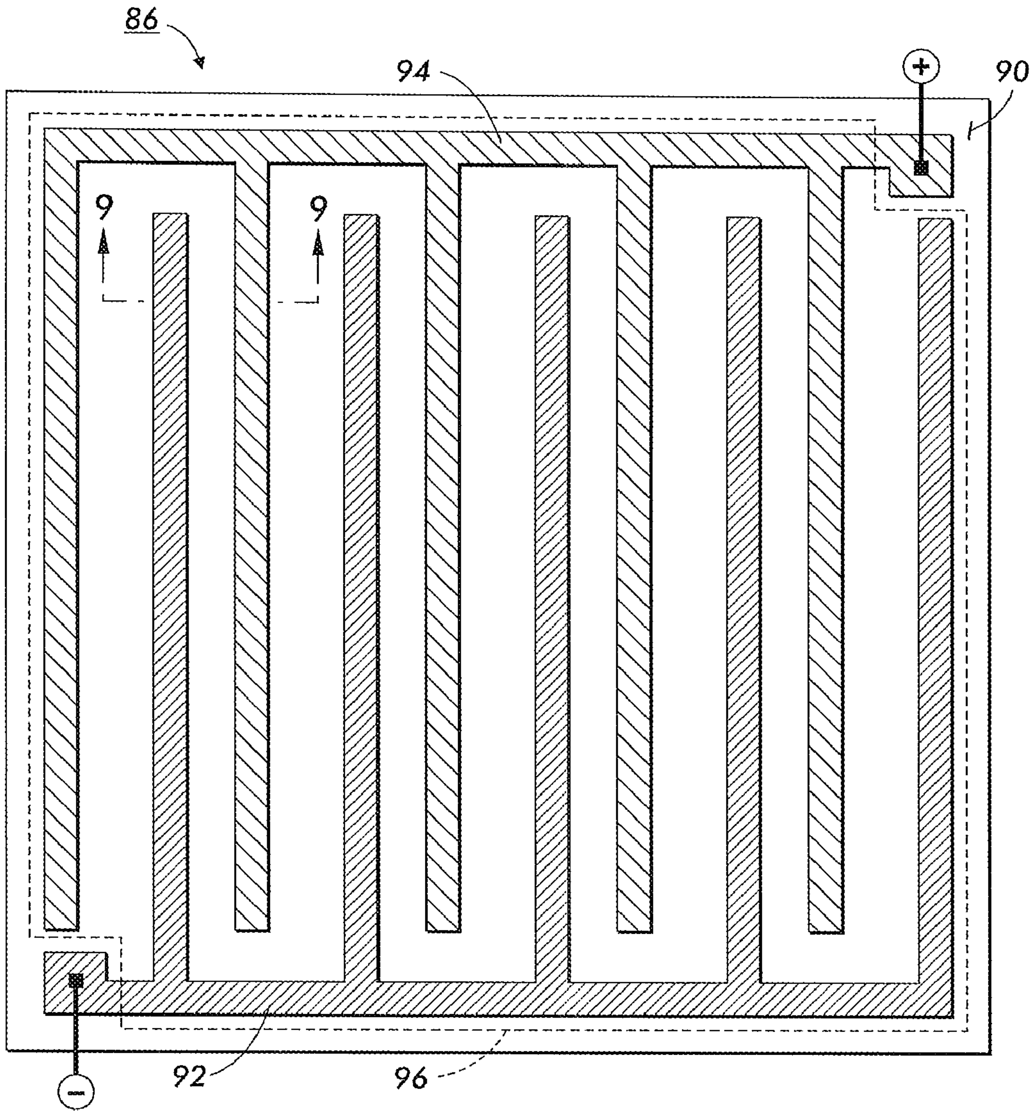
FIG. 9 is a top plan view of a surface of an exemplary embodiment of a positive temperature coefficient (PTC) heater.
Figure 10:
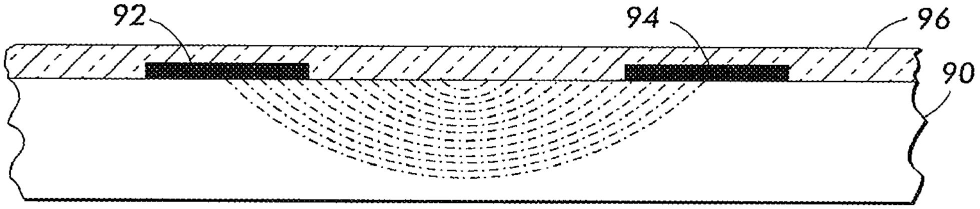
FIG. 10 is a cross-section through line 9-9 of the PTC heater of FIG. 8.

FIG. 9 shows an exemplary grid pattern that could be used. Two intertwining conductive traces 92, 94 are overlaid on a surface of a PTC material 90 such that they do not contact each other. The terminus of one trace 92 connects to one part of a circuit and the terminus of the other trace 94 connects to the remainder of the circuit. The potential difference between these two ends of the circuit is sufficient to allow current to flow through the PTC material such that its temperature increases. See FIG. 10. The conductor coatings are placed on the surface of the PTC material 90 contacting the surface of the drip plate 29. If the drip plate is made of some conductive material, such as, for example, aluminum, the drip plate will short the connection between the two conductive coatings unless some preventative measure is taken. For example, a passivation layer 96, i.e., a coating of some nonconductive or low conductive material can be placed over the conductor coatings to prevent electrical conduction through the drip plate. The PTC heating device 86 can then be bonded to the surface of the drip plate 29.

Figure 11:
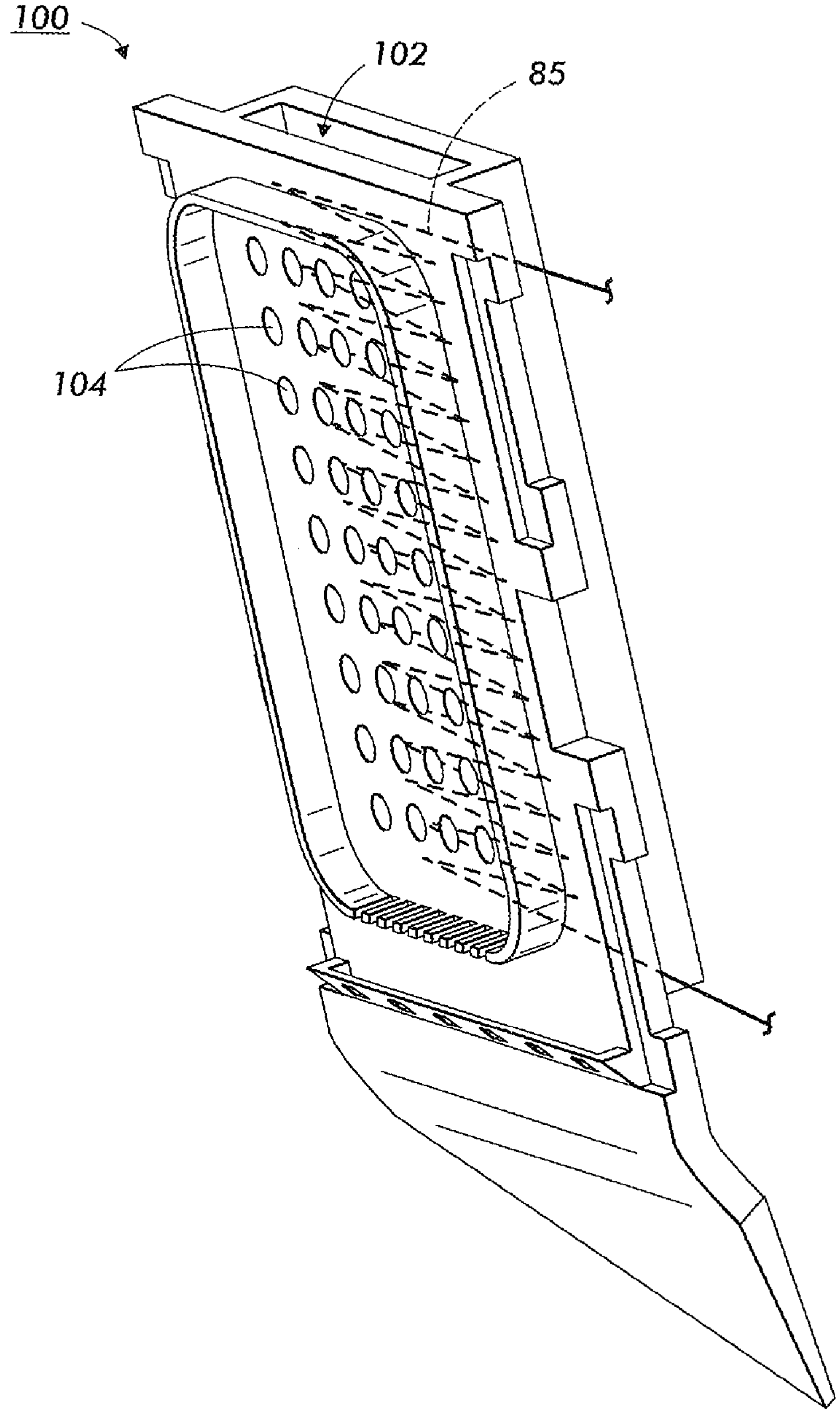
FIG. 11 shows another exemplary embodiment of a drip plate including a schematic of an internal heating device.

A PTC heating device would work well with a specialized drip/melt plate herein referred to as a drip panel 100, such as that shown in FIG. 11. A melt and delivery system that is highly integrated can be accomplished by incorporating molten ink containment and directional flow and delivery location control into a common component. This embodiment will be referred to as a drip panel for convenience but could also be called a drip plate or melt plate. The drip panel 100 incorporates features previously found in the combination of drip and melt plates of earlier designs with other new features. This highly integrated system could provide multiple benefits such as component cost reduction, assembly ease, inherent electrical shock safety and expanded flexibility in designing ever more complex and purposeful supplementary features for mounting, thermal isolation, cable routing, solidified ink stick and solidified ink melt front retention, ink stick positional control at the melt panel interface and so forth.

These benefits are accomplished by using high temperature plastic, with or without metallic or other external platings, to form the melt panel and supplementary features into a single integrated unit. Various heater technologies could be incorporated with greater flexibility with this approach as well. The heater 85 could be held against the desired face and be retained and/or clamped by posts, clips, guides, clamps or similar features formed into the melt panel. Heater 85 could also be bonded to the desired face of panel. The heater 85 could be inserted into an open or closed slot 102 or pocket in the panel. Rather than be inserted through slot 102, the heater 85 could also be insert molded into the panel 100 itself.

Heating technologies applicable to this melt panel concept would include, but not be limited to, ceramic, wire and mica, foil, silicon, PTC and heater hybrid, sandwiched PTC and single sided PTC devices. The preferred heating technology would be a single sided PTC device as previously described.

Form or configuration flexibility is potentially high with a plastic melt panel. Ink flow channels, retention features, melt rate considerations by ink stick area location (more heat at edges or center, as example) and flow direction to almost any appropriately configured delivery feature, such as an angled or curved drip point, can all be optimized. The panel 100 can be essentially flat with respect to the ink delivery location or drip point relative to one of the panel faces or it could have considerable topography, including an ink delivery location non planar with the panel faces.

Drip or melt plate configurations could have holes or perforations 104 allowing or encouraging ink to flow to the side opposite the side ink sticks are directed toward. In FIG. 11, the holes 104 actually pass into a cavity where ink can then drip down the other side of the bent lower portion. With the plastic melt panel, the potential advantages of the holes 104 can be achieved or improved by creating channels, ribs and the like in the interior portion. Of course, holes through the drip plate must avoid the heating mechanism. In FIG. 11 the internal heating element can be positioned so that it does not interfere with the passage of ink through the holes 104.

While holes are shown only in the particular embodiment 104 illustrated in FIG. 11, holes shown may be present in any of the drip plates 29 or melt plates 60 shown and described herein. As discussed earlier cutout portions 44 may be desirable in the melt plate of a two plate assembly. Holes 104 through a drip plate or through a melt plate and drip plate combination could be used for a variety of reasons. For example, the presence of holes increases the surface area of the drip plate, thereby increasing melt flow. Further, holes could be used to control the temperature of the ink. A passage through the drip plate may increase or decrease the temperature of the ink depending on the length of the passage and the particular path; e.g., ink could be selectively routed toward or away from heating sources. The pathways will be limited in some melt assemblies as the heating mechanism may get in the way. Holes 104 also help limit the spread of ink about the contact point between the ink stick and the drip or melt plate. By giving it a channel to flow through, there is less chance for ink to be spilled off to the sides or around the plate. This allows the use of a narrower melt panel. Finally, the presence of holes through the plate reduces the opportunity for molten ink to bridge backward into contact with the ink stick chute or feed channels.

A variety of materials could be considered for the melt panel, including, but not limited to: Poly-amide-imide, Polyarylether, Polyarylsulfone, Polyetheretherketone, Polyimide, Polyphenylene Oxide, Polyphenylene Sulfide, Polysulfone and various compounded plastics. Cost, material compatibility with the specific ink formulation in use, moldability in the various panel configurations and temperature range of operation would be the biggest factors in material selection. PPS (Polyphenylene Sulfide) and high temperature nylon compounds would be among of the more preferred materials.

In addition to the previously mentioned heating mechanisms, other heaters exist that may be used. For example, another drip plate heater technology that could be used is a thick film on ceramic substrate. In embodiments, this includes bonding a very thin unit onto the drip plate in an area that is chiefly flat. Pass through passages or holes through the drip plate would be possible in the flat areas of the drip plate where the heating unit was not bonded. Another heater technology alternative is resistance wire wound over and enclosed by mica. This type of heater could be partially encircled with a thin aluminum backing, providing structural support and a thermally conductive surface to transfer heat to the drip plate.

All these and other heater technologies lend themselves to use in this closed loop, actively controlled and/or thermally fused solid ink melt plate application.

While the present invention has been described with reference to specific embodiments thereof, it will be understood that it is not intended to limit the invention to these embodiments. It is intended to encompass alternatives, modifications, and equivalents, including substantial equivalents, similar equivalents, and the like, as may be included within the spirit and scope of the invention. All patent applications, patents and other publications cited herein are incorporated by reference in their entirety.

The invention claimed is:

1. An ink loader for use in a phase change ink printer, comprising: at least one channel having an entry end and an exit end; and a melt assembly, which includes a non-metallic, non-ceramic drip plate with first and second sides, wherein the lower portion of the plate is shaped to form a drip point, and one of the first and the second sides of the drip plate is connected to a heating mechanism to enable the other side of the drip plate to melt solid ink sticks received from the exit end of the channel.

2. The ink loader of claim 1, the heating mechanism further comprising a self regulating heating device thermally connected to the drip plate.

3. The ink loader of claim 2, wherein the heating device is a positive temperature coefficient (PTC) material.

4. The ink loader of claim 1, wherein the drip plate is plastic.

5. The ink loader of claim 1, further comprising a melt plate fastened to the side of the drip plate that melts solid ink sticks received from the exit end of the channel.

6. An ink loader for use in a phase change ink printer, comprising: at least one channel having an entry end and an exit end; and a melt assembly, which includes a non-metallic, non-ceramic drip plate with first and second sides, wherein the lower portion of the plate is shaped to form a drip point, and a self regulating heating device connected to one of the first and second sides of the drip plate, wherein the heating device includes a positive temperature coefficient (PTC) material and the PTC material itself is used to heat one side of the drip plate to enable the other side of the drip plate to melt solid ink sticks received from the exit end of the channel.

7. The ink loader of claim 6, wherein the drip plate is plastic.

8. The ink loader of claim 6, further comprising a melt plate fastened to the side of the drip plate enabled to melt solid ink sticks received from the exit end of the channel.

* * * * *